(12) United States Patent
Fukatani

(10) Patent No.: US 8,257,843 B2
(45) Date of Patent: Sep. 4, 2012

(54) INTERLAYER FOR LAMINATED GLASS AND LAMINATED GLASS

(75) Inventor: Juichi Fukatani, Shiga (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 12/734,032

(22) PCT Filed: Oct. 10, 2008

(86) PCT No.: PCT/JP2008/068504
§ 371 (c)(1),
(2), (4) Date: May 12, 2010

(87) PCT Pub. No.: WO2009/048147
PCT Pub. Date: Apr. 16, 2009

(65) Prior Publication Data
US 2010/0255318 A1    Oct. 7, 2010

(30) Foreign Application Priority Data
Oct. 12, 2007 (JP) ................................ 2007-266921

(51) Int. Cl.
*B32B 17/06* (2006.01)
*B32B 15/04* (2006.01)

(52) U.S. Cl. ......... 428/701; 428/432; 428/689; 428/697

(58) Field of Classification Search .................. 428/426, 428/323, 432, 689, 697, 701
See application file for complete search history.

(56) References Cited

U.S. PATENT DOCUMENTS

| | | | |
|---|---|---|---|
| 6,620,477 B2 * | 9/2003 | Nagai | 428/46 |
| 2002/0039649 A1 * | 4/2002 | Nagai | 428/328 |
| 2004/0234778 A1 * | 11/2004 | Fukatani et al. | 428/426 |
| 2005/0136243 A1 * | 6/2005 | Fisher | 428/323 |
| 2010/0068532 A1 * | 3/2010 | Fisher | 428/426 |

FOREIGN PATENT DOCUMENTS

| | | |
|---|---|---|
| JP | 2001-089202 | 4/2001 |
| JP | 2002-173347 | 6/2002 |
| JP | 2006-182599 | 7/2006 |

OTHER PUBLICATIONS

Fukaya JP 2006-182599 Machine translation.*
Fukaya JP2006-182599 Human Translation.*
International Search Report issued Nov. 11, 2008 in International (PCT) Application No. PCT/JP2008/068504.
European Office Action issued May 10, 2011 in corresponding European Patent Application No. 08837634.8.

* cited by examiner

*Primary Examiner* — Jennifer McNeil
*Assistant Examiner* — Lauren Robinson
(74) *Attorney, Agent, or Firm* — Wenderoth, Lind & Ponack, L.L.P.

(57) ABSTRACT

The present invention aims to provide an interlayer film for a laminated glass, which has excellent heat shielding property and allows infrared communication waves to sufficiently pass therethrough. The present invention is an interlayer film for a laminated glass, which includes an infrared communication wave-transmitting region and a transparent region in a plane of the interlayer film, the infrared communication wave-transmitting region containing a binder resin and zinc oxide particles doped with a trivalent or tetravalent metal, the transparent region containing a binder resin and metal hexaboride particles.

4 Claims, 1 Drawing Sheet

[Fig. 1]
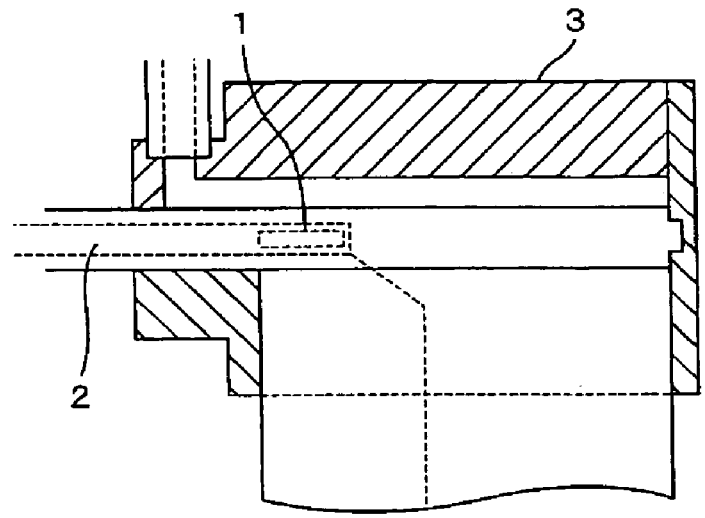
[Fig. 2]
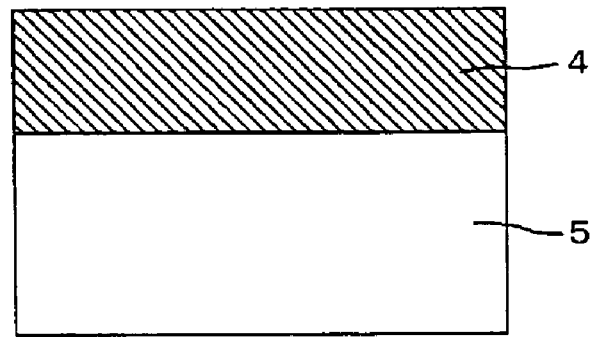
[Fig. 3]
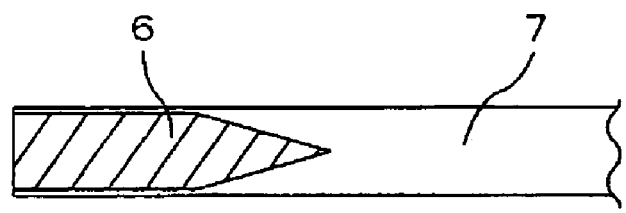

INTERLAYER FOR LAMINATED GLASS AND LAMINATED GLASS

This application is a U.S. national stage of International Application No. PCT/JP2008/068504 filed Oct. 10, 2008.

TECHNICAL FIELD

The present invention relates to an interlayer film for a laminated glass, which has excellent heat shielding property and allows infrared communication waves to sufficiently pass therethrough. The present invention further relates to a laminated glass which is obtained by using the interlayer film for a laminated glass.

BACKGROUND ART

A laminated glass is a safety glass because few glass fragments are scattered even if it is broken by impact from the outside. Therefore, laminated glasses have been widely used for windowpanes or the like of vehicles such as automobiles, aircrafts, and buildings. An example of those laminated glasses is a laminated glass produced by interposing an interlayer film for a laminated glass including, as a binder resin, a polyvinyl acetal plasticized by a plasticizer between at least a pair of glass plates, and then laminating and integrating the glass plates and the interlayer film.

The wavelength range of infrared rays is 780 nm or longer, which is in long-wavelength side as compared to the wavelength range of visible lights. The amount of energy of infrared rays is approximately 10% of that of ultraviolet rays. When absorbed in a material, infrared rays are converted into heat and then emitted so that the surrounding temperature is increased. For example, by shielding infrared rays which pass through a windshield or a side window glass of an automobile, the temperature inside the automobile can be prevented from increasing. Since there is a trend that automobiles and the like have larger openings these days, a laminated glass with a reduced infrared ray transmissivity has been demanded.

Patent Document 1 discloses an interlayer film for a laminated glass having an improved infrared ray-shielding performance due to lanthanum hexaboride particles dispersed therein. Since lanthanum hexaboride particles have a high infrared ray-shielding performance, dispersion of even a little amount of lanthanum hexaboride particles in the interlayer film for a laminated glass makes it possible for the interlayer film to achieve a high infrared ray-shielding rate.

In-vehicle devices controllable using infrared communication waves have been developed these days. A rain sensor, for example, detects the presence of raindrops by having infrared rays of about 850 nm wavelength reflected on the raindrops on the windshield. For the control or the like of the in-vehicle device, near-infrared rays having a wavelength of about 800 to 1000 nm are used.

Lanthanum hexaboride particles shield infrared rays having a wavelength shorter than 1500 nm, and notably near-infrared rays having a wavelength of about 800 to 1000 nm. Therefore, when an interlayer film for a laminated glass containing lanthanum hexaboride particles is used, the infrared communication waves do not pass through the film, problematically making it impossible to use the in-vehicle device.

Patent Document 2 discloses an interlayer film for a laminated glass which allows infrared communication waves to be transmitted from outside to inside, or vice versa, of a vehicle by providing an infrared ray-transmittable region which practically does not include infrared ray-shielding particles.

When such an infrared ray-transmittable region is provided, even though infrared communication waves pass through the region, the infrared ray-shielding performance of the windshield as a whole is significantly decreased. Accordingly, it is problematically impossible to prevent the temperature inside a vehicle from increasing.

Patent Document 1: Japanese Kokai Publication 2001-89202 (JP-A 2001-89202)
Patent Document 2: Japanese Kokai Publication 2002-173347 (JP-A 2002-173347)

DISCLOSURE OF THE INVENTION

Problems to be Solved by the Invention

It is an object of the present invention to provide an interlayer film for a laminated glass, which has excellent heat shielding property and allows infrared communication waves to sufficiently pass therethrough. It is further an object of the present invention to provide a laminated glass which is obtained by using the interlayer film for a laminated glass.

Means for Solving the Problems

The present invention provides an interlayer film for a laminated glass, which includes an infrared communication wave-transmitting region and a transparent region in a plane of the interlayer film, wherein the infrared communication wave-transmitting region contains a binder resin and zinc oxide particles doped with a trivalent or tetravalent metal, and the transparent region contains a binder resin and metal hexaboride particles.

The following description will discuss the present invention in more detail.

The present inventor has found that zinc oxide particles doped with a trivalent or tetravalent metal shield infrared rays having a wavelength of 1500 to 2100 nm but relatively easily transmit the infrared rays having a wavelength of 800 to 1000 nm. The present inventor further found that, in the interlayer film for a laminated glass which has an infrared communication wave-transmitting region and a transparent region in a plane of the interlayer film, when metal hexaboride particles are included in the transparent region and also zinc oxide particles doped with a trivalent or tetravalent metal are included in the infrared communication wave-transmitting region, the interlayer film can achieve both the excellent heat shielding property and the transmissivity of infrared communication waves. The present inventor thus completed the present invention.

The interlayer film for a laminated glass of the present invention includes an infrared communication wave-transmitting region and a transparent region in a plane of the interlayer film.

According to the present invention, the phrase "infrared communication wave-transmitting region" refers to a region through which an infrared ray having a wavelength of 800 to 1000 nm, which is normally used as an infrared communication wave, can pass. Further, the phrase "infrared communication wave" is not limited to an infrared communication wave used for information communication, but further includes infrared rays having a wavelength of 800 to 1000 nm, for use in sensors, whose amplitude or frequency is not modulated.

The infrared communication wave-transmitting region contains a binder resin and zinc oxide particles doped with a trivalent or tetravalent metal.

The binder resin contained in the infrared communication wave-transmitting region is not particularly limited. Examples of the binder resin include a polyvinyl acetal resin, a polyurethane resin, an ethylene-vinyl acetate resin, an ethylene-ethyl acrylate resin, a vinyl chloride resin, a polyester resin, and the like. A sheet containing any of the foregoing binder resins has excellent performances required for an interlayer film for a laminated glass, such as adhesiveness, weathering resistance, penetration resistance, and transparency. A polyvinyl acetal resin is preferable and a polyvinyl butyral resin is more preferable among the above examples as those resins have been widely used in interlayer films for windshields.

The zinc oxide particles doped with a trivalent or tetravalent metal shield infrared rays having a wavelength of 1500 to 2100 nm but relatively easily transmit infrared rays having a wavelength of 800 to 1000 nm. Upon inclusion of the zinc oxide particles doped with a trivalent or tetravalent metal, the infrared communication wave-transmitting region not only allows infrared communication waves to pass therethrough but shields infrared rays having a wavelength of around 1500 to 2100 nm as well, making it possible to prevent the temperature inside a vehicle from increasing.

Examples of the zinc oxide particles doped with a trivalent or tetravalent metal include indium-doped zinc oxide particles, aluminum-doped zinc oxide particles, gallium-doped zinc oxide particles, or other zinc oxide particles. Gallium-doped zinc oxide particles are preferable among the foregoing examples.

The surface of the zinc oxide particles doped with a trivalent or tetravalent metal may be coated with a resin, a metal, a metal oxide, or other coatings.

The volume average particle diameter of the zinc oxide particles doped with a trivalent or tetravalent metal is preferably 0.001 µm in the lower limit and 0.1 µm in the upper limit. When the volume average particle diameter of the zinc oxide particles doped with a trivalent or tetravalent metal is less than 0.001 µm, the capability of shielding infrared rays having a wavelength of 1500 to 2100 nm may not be sufficiently obtained. When the volume average particle diameter is more than 0.1 µm, the interlayer film for a laminated glass to be produced may have a low transparency. The more preferable upper limit of the volume average particle diameter of the zinc oxide particles doped with a trivalent or tetravalent metal is 0.08 µm.

The amount of the zinc oxide particles doped with a trivalent or tetravalent metal in the infrared communication wave-transmitting region is preferably 0.1 parts by weight in the lower limit and 10 parts by weight in the upper limit relative to 100 parts by weight of the binder resin. When the amount of the zinc oxide particles doped with a trivalent or tetravalent metal is less than 0.1 parts by weight, the capability of shielding infrared rays having a wavelength of 1500 to 2100 nm may not be sufficiently obtained. When the amount is more than 10 parts by weight, the interlayer film for a laminated glass to be produced may have a low transparency. The upper limit of the amount of the zinc oxide particles doped with a trivalent or tetravalent metal is more preferably 5 parts by weight and furthermore preferably 3 parts by weight.

The zinc oxide particles doped with a trivalent or tetravalent metal may be produced by a conventionally known method.

For example, the gallium-doped zinc oxide particles may be produced by a method including preparing zinc oxide powders doped with gallium in an amount of 2 to 20% by weight by coprecipitation or plasma spraying, firing the resulting zinc oxide powders under reduction, optionally adding a surface modifier such as an additive or a dispersant, and pulverizing the resulting product, and by other methods.

The infrared communication wave-transmitting region may contain a plasticizer. It is preferable that the region contains a plasticizer especially when the aforementioned binder resin is a polyvinyl butyral resin.

The plasticizer is not particularly limited, and examples thereof include an organic plasticizer such as a monobasic organic acid ester and a polybasic organic acid ester; a phosphate plasticizer such as an organic phosphate plasticizer and an organic phosphite plasticizer; and other kids of plasticizers.

Examples of the plasticizer include triethylene glycol di-2-ethyl butyrate, triethylene glycol di-2-ethylhexanoate, triethylene glycol dicaprylate, triethylene glycol di-n-octanoate, triethylene glycol di-n-heptanoate, tetraethylene glycol di-n-heptanonate, dibutyl sebacate, dioctyl azelate, dibutyl carbitol adipate, tributoxy ethyl phosphate, isodecyl phenyl phosphate, triisopropyl phosphate, and the like.

The amount of the plasticizer in the infrared communication wave-transmitting region is not particularly limited. When a polyvinyl butyral resin is used as the binder resin, the amount of the plasticizer is preferably parts by weight in the lower limit and 75 parts by weight in the upper limit relative to 100 parts by weight of the polyvinyl butyral resin. When the amount of the plasticizer is less than 20 parts by weight, the interlayer film for a laminated glass to be produced may not sufficiently absorb impact from breakage of the glass. When the amount is more than 75 parts by weight, the interlayer film for a laminated glass to be produced is so soft that the penetration resistance thereof may be deteriorated.

The infrared communication wave-transmitting region may contain a colorant.

The colorant may be any of an inorganic pigment, an organic pigment, or a dye. Examples of the colorant include barium sulfate, barium carbonate, calcium carbonate, alumina, clay, silica, talc, magnesium carbonate, titanium oxide, carbon black, aniline black, cyanine black, anthraquinone blue, anthraquinone green, anthraquinone yellow, anthraquinone red, dianisidine red, isoindolinone yellow, anthrapyrimidine yellow, phthalocyanine blue, phthalocyanine green, and the like.

The infrared communication wave-transmitting region may contain, if necessary, a conventionally known additive such as an ultraviolet absorber, an antioxidant, a pigment, a dye, an adhesive modifier, a surfactant, a flame retardant, and an antistatic agent.

The transparent region contains a binder resin and metal hexaboride particles. Since the metal hexaboride particles exhibit an extremely high infrared ray-shielding performance, the presence of the transparent region containing the metal hexaboride particles can effectively prevent the temperature inside the vehicle from increasing.

Examples of the metal hexaboride include lanthanum hexaboride ($LaB_6$), yttrium hexaboride ($YB_6$), cerium hexaboride ($CeB_6$), praseodymium hexaboride ($PrB_6$), neodymium hexaboride ($NdB_6$), samarium hexaboride ($SmB_6$), europium hexaboride ($EuB_6$), gadolinium hexaboride ($GdB_6$), terbium hexaboride ($TbB_6$), dysprosium hexaboride ($DyB_6$), holmium hexaboride ($HoB_6$), erbium hexaboride ($ErB_6$), thulium hexaboride ($TmB_6$), ytterbium hexaboride ($YbB_6$), lutetium hexaboride ($LuB_6$), strontium hexaboride ($SrB_6$), calcium hexaboride ($CaB_6$), titanium hexaboride ($TiB_6$), zirconium hexaboride ($ZrB_6$), hafnium hexaboride ($HfB_6$), vanadium hexaboride ($VB_6$), niobium hexaboride ($NbB_6$), chromium hexaboride ($CrB_6$), molybdenum hexaboride ($MoB_6$), and the like. Those metal hexaboride particles may be used solely or in combination of two or more kinds thereof. Lanthanum hexaboride ($LaB_6$) is preferable among the above examples.

The volume average particle diameter of the metal hexaboride particles is preferably 0.001 μm in the lower limit and 0.1 μm in the upper limit. When the volume average particle diameter of the metal hexaboride particles is less than 0.001 μm, a large amount of the particles may need to be added to sufficiently achieve the infrared ray-shielding performance. When the volume average particle diameter is more than 0.1 μm, the interlayer film for a laminated glass to be produced may have a low transparency. The more preferable upper limit of the volume average particle diameter of the metal hexaboride particles is 0.08 μm.

The amount of the metal hexaboride particles is preferably 0.005 parts by weight in the lower limit and 1.0 part by weight in the upper limit relative to 100 parts by weight of the binder resin. When the amount of the metal hexaboride particles is less than 0.005 parts by weight, the infrared ray-shielding performance may not be sufficiently obtained. When the amount is more than. 1.0 part by weight, the interlayer film for a laminated glass to be produced may have a low transparency.

The binder resin to be contained in the transparent region is not particularly limited, and the same binder resin as the one used in the infrared communication wave-transmitting region may be used. Moreover, the binder resin may contain a plasticizer or an additive in a similar manner as the infrared communication wave-transmitting region.

The transparent region may further contain the zinc oxide particles doped with a trivalent or tetravalent metal to achieve a better infrared ray-shielding effect. The amount of the zinc oxide particles doped with a trivalent or tetravalent metal in the transparent region is preferably 0.1 parts by weight in the lower limit and 5 parts by weight in the upper limit relative to 100 parts by weight of the binder resin. The more preferable upper limit of the amount of the zinc oxide particles doped with a trivalent or tetravalent metal is 2 parts by weight.

The infrared communication wave-transmitting region may be placed in any part of a plane of the interlayer film for a laminated glass according to the present invention. For example, the infrared communication wave-transmitting region and the transparent region may be arranged in a stripe pattern as shown in FIG. 2. Alternatively, the infrared communication wave-transmitting region may be allocated only at a portion where an in-vehicle device controllable using infrared communication waves is mounted. Further, as shown in FIG. 3, a laminated structure may be employed in which the infrared communication wave-transmitting region is interposed between the transparent regions.

The thickness of the interlayer film for a laminated glass of the present invention is not particularly limited. For example, the thickness of the interlayer film for a laminated glass to be used in a windshield for automobiles is generally 0.1 to 3.0 mm.

The method for producing the interlayer film for a laminated glass of the present invention is not particularly limited. Examples of the method are: a method including arranging, on a multilayer extrusion mold, an intermediate layer for forming the infrared communication wave-transmitting region between upper and lower surface layers for forming the transparent region, and extruding the three-layered sheet with the intermediate layer having a narrower width than the upper and lower surface layers; a method of injecting materials for the infrared communication wave-transmitting region through a conduit tube into the mold; and other methods.

A laminated glass obtained by using the interlayer film for a laminated glass of the present invention is also one aspect of the present invention.

A laminated glass in which the interlayer film for a laminated glass of the present invention is interposed between a pair of transparent plates is also one aspect of the present invention.

The transparent plate used for the laminated glass of the present invention is not particularly limited, and a commonly used transparent glass plate may be employed. Examples of the glass plate include a float glass plate, a polished glass plate, a figured glass plate, a wired glass, a line wire glass plate, a colored glass plate, a heat-absorbing glass, a heat-reflecting glass, a green glass plate, and other kinds of glass. Alternatively, an organic plastic plate such as a polycarbonate plate and a polyacrylate plate may be used. Preferably, at least one of the transparent plates is a glass plate.

Effects of the Invention

The present invention provides an interlayer film for a laminated glass, which has excellent heat shielding property and allows infrared communication waves to sufficiently pass therethrough. The present invention can further provide a laminated glass which is obtained by using the interlayer film for a laminated glass.

BEST MODE FOR CARRYING OUT THE INVENTION

The following description will discuss the present invention in more detail with reference to Examples; however, the present invention is not limited to those Examples.

EXAMPLE 1

As a raw material of a transparent region, a mixture prepared by mixing 140 parts by weight of triethylene glycol di-2-ethylhexanoate (3GO), 360 parts by weight of a polyvinyl butyral resin, and 0.1 parts by weight of lanthanum hexaboride particles having a volume average particle diameter of 0.02 μm was supplied to an extruder. The extruder is provided with an L-die mold 3 in which a conduit tube 2 having a slit-shaped opening 1 for forming an infrared communication wave-transmitting region is inserted as shown in FIG. 1. Next, as a raw material of the infrared communication wave-transmitting region, a mixture prepared by mixing 140 parts by weight of triethylene glycol di-2-ethylhexanoate (3GO), 360 parts by weight of a polyvinyl butyral resin, and 5 parts by weight of gallium-doped zinc oxide particles having a volume average particle diameter of 0.02 μm was supplied to the conduit tube and then the mixtures were extrusion-molded. As a result, an interlayer film for a laminated glass with a thickness of 0.8 mm having, in a plane, the infrared communication wave-transmitting region 4 and the transparent region 5 as shown in FIG. 2 was obtained. The infrared communication wave-transmitting region of the thus-obtained interlayer film for a laminated glass consists of layers 7 forming the transparent region having a thickness of approximately 0.04 mm and a layer 6 forming the infrared communication wave-transmitting region having a thickness of approximately 0.72 mm, with the layer 6 interposed between the layers 7. FIG. 3 shows a partial cross-sectional view of the structure of the thus-obtained interlayer film for a laminated glass.

The interlayer film for a laminated glass was laminated between two transparent float glass plates each having a thickness of 2.5 mm and then kept in a vacuum bag at a temperature of 160° C. for 30 minutes for temporary bonding. The temporarily bonded laminated body was placed in an autoclave machine and laminated by applying a pressure of 1.3 MPa and heat of 135° C. so that a test piece of a laminated glass was prepared.

EXAMPLE 2

An interlayer film for a laminated glass and a test piece of a laminated glass were prepared in the same manner as in Example 1, except that, as a raw material of the infrared communication wave-transmitting region, a mixture prepared by mixing 140 parts by weight of triethylene glycol di-2-ethylhexanoate (3GO), 360 parts by weight of a polyvinyl butyral resin, 5 parts by weight of gallium-doped zinc oxide particles having a volume average particle diameter of 0.02 μm, and 3 parts by weight of anthraquinone blue was used.

EXAMPLE 3

An interlayer film for a laminated glass and a test piece of a laminated glass were prepared in the same manner as in Example 2, except that, as a raw material of the transparent region, a mixture prepared by mixing 5 parts by weight of gallium-doped zinc oxide particles having a volume average particle diameter of 0.02 μm, 0.1 parts by weight of lanthanum hexaboride particles, 140 parts by weight of triethylene glycol di-2-ethylhexanoate (3GO), and 360 parts by weight of a polyvinyl butyral resin was used.

EXAMPLE 4

An interlayer film for a laminated glass and a test piece of a laminated glass were prepared in the same manner as in Example 2, except that, as a raw material of the transparent region, a mixture prepared by mixing 5 parts by weight of gallium-doped zinc oxide particles having a volume average particle diameter of 0.02 μm, 0.05 parts by weight of lanthanum hexaboride particles, 140 parts by weight of triethylene glycol di-2-ethylhexanoate (3GO), and 360 parts by weight of a polyvinyl butyral resin was used.

EXAMPLE 5

An interlayer film for a laminated glass and a test piece of a laminated glass were prepared in the same manner as in Example 2, except that, as a raw material of the transparent region, a mixture prepared by mixing 2 parts by weight of gallium-doped zinc oxide particles having a volume average particle diameter of 0.02 μm, 0.05 parts by weight of lanthanum hexaboride particles, 140 parts by weight of triethylene glycol di-2-ethylhexanoate (3GO), and 360 parts by weight of a polyvinyl butyral resin was used.

EXAMPLE 6

An interlayer film for a laminated glass and a test piece of a laminated glass were prepared in the same manner as in Example 1, except that, the blending quantity of the gallium-doped zinc oxide particles was changed to 3.5 parts by weight.

EXAMPLE 7

An interlayer film for a laminated glass and a test piece of a laminated glass were prepared in the same manner as in Example 1, except that, the blending quantity of the gallium-doped zinc oxide particles was changed to 2 parts by weight.

COMPARATIVE EXAMPLE 1

An interlayer film for a laminated glass and a test piece of a laminated glass were prepared in the same manner as in Example 1, except that, as a raw material of the infrared communication wave-transmitting region, a mixture prepared by mixing 0.1 parts by weight of lanthanum hexaboride particles having a weight average particle diameter of 0.02 μm, 140 parts by weight of triethylene glycol di-2-ethylhexanoate (3GO), 360 parts by weight of a polyvinyl butyral resin, and 3 parts by weight of anthraquinone blue was used.

COMPARATIVE EXAMPLE 2

An interlayer film for a laminated glass and a test piece of a laminated glass were prepared in the same manner as in Example 1, except that, a mixture prepared by mixing 0.05 parts by weight of lanthanum hexaboride particles having a weight average particle diameter of 0.02 μm, 140 parts by weight of triethylene glycol di-2-ethylhexanoate (3GO), 360 parts by weight of a polyvinyl butyral resin, and 3 parts by weight of anthraquinone blue was used as a raw material of the infrared communication wave-transmitting region, and a mixture prepared by mixing 0.05 parts by weight of lanthanum hexaboride particles having a volume average particle diameter of 0.02 μm, 140 parts by weight of triethylene glycol di-2-ethylhexanoate (3GO), and 360 parts by weight of a polyvinyl butyral resin was used as a raw material of the transparent region.

<Evaluation>

The interlayer films for a laminated glass obtained in Examples 1 to 7 and Comparative Examples 1 and 2 were evaluated for the following characteristics. Table 1 shows the results.

(Spectral Characteristics)

The transmittance (1) of visible lights having a wavelength of 380 to 780 nm, the transmittance (2) of infrared rays having a wavelength of 800 to 2100 nm, and the transmittance (3) of infrared rays having a wavelength of 900 nm were measured at the center portion of the transparent region and the center portion of the infrared communication wave-transmitting region of each of the above-obtained interlayer films for a laminated glass using a spectrophotometer ("U4000" produced by Hitachi Ltd.) by a method based on JIS R 3106.

(Evaluation of Heat Shielding Property)

Heat shielding property was evaluated based on the following criteria.

o: The transparent region showed 70% or less transmittance of an infrared ray having a wavelength of 800 to 2100 nm x: The transparent region showed more than 70% transmittance of an infrared ray having a wavelength of 800 to 2100 nm It is generally considered that, when an interlayer film for a laminated glass with 70% or less transmittance of an infrared ray having a wavelength of 800 to 2100 nm is used in a windshield or a side window glass of an automobile, the temperature inside the automobile can be prevented from increasing. More preferably, the transmittance of an infrared ray having a wavelength of 800 to 2100 nm is 65% or less.

(Evaluation of Operability of Sensor)

Each of the interlayer films for a laminated glass obtained in Examples and Comparative. Examples was laminated between two green glass plates (thickness: 2.0 mm) and kept in a vacuum bag at a temperature of 160° C. for 30 minutes for temporary bonding. The temporarily bonded laminated body was placed in an autoclave machine and laminated by applying a pressure of 1.3 MPa and heat of 135° C. so that a test piece of a laminated glass was prepared. A rain sensor was mounted on the infrared communication wave-transmitting region of the resulting test piece of the laminated glass. The rain sensor was tested as to whether it normally functioned or not. The results were evaluated based on the following criteria.

o: Functioned well
x: Malfunctioned or did not function

EXPLANATION OF SYMBOLS 1 slit-shaped opening
2 conduit tube
3 L-die mold
4 infrared communication wave-transmitting region
5 transparent region
6 layer constituting infrared communication wave-transmitting region
7 layer constituting transparent region

TABLE 1

|  |  |  | Example 1 | Example 2 | Example 3 | Example 4 | Example 5 | Example 6 | Example 7 | Comparative Example 1 | Comparative Example 2 |
|---|---|---|---|---|---|---|---|---|---|---|---|
| Composition (Parts by weight) | Infrared communication wave-transmitting region | Gallium-doped zinc oxide particles | 5 | 5 | 5 | 5 | 5 | 3.5 | 2 | — | — |
|  |  | Lanthanum hexaboride particles | — | — | — | — | — | — | — | 0.1 | 0.05 |
|  |  | Plasticizer (3GO) | 140 | 140 | 140 | 140 | 140 | 140 | 140 | 140 | 140 |
|  |  | Polyvinyl butyral resin | 360 | 360 | 360 | 360 | 360 | 360 | 380 | 360 | 360 |
|  |  | Pigment (anthraquinone pigment) | — | 3 | 3 | 3 | 3 | — | — | 3 | 3 |
|  | Transparent region | Gallium-doped zinc oxide particles | — | — | 5 | 5 | 2 | — | — | — | — |
|  |  | Plasticizer (3GO) | 140 | 140 | 140 | 140 | 140 | 140 | 140 | 140 | 140 |
|  |  | Polyvinyl butyral resin | 360 | 360 | 360 | 360 | 360 | 360 | 360 | 360 | 360 |
|  |  | Lanthanum hexaboride particles | 0.1 | 0.1 | 0.1 | 0.05 | 0.05 | 0.1 | 0.1 | 0.1 | 0.05 |
| Evaluation | Transmittance of visible lights (Tv) (%) | Infrared communication wave-transmitting region | 81.2 | 5.0 | 5.0 | 5.0 | 5.0 | 86.4 | 87.5 | 5.1 | 5.0 |
|  |  | Transparent region | 82.6 | 82.6 | 75.4 | 78.1 | 82.6 | 82.8 | 82.6 | 82.6 | 87.8 |
|  | Transmittance of infrared rays (TIR) (%) | Infrared communication wave-transmitting region | 57.3 | 56.8 | 56.8 | 56.8 | 56.8 | 62.8 | 67.9 | 57.0 | 71.5 |
|  |  | Transparent region | 57.4 | 57.4 | 41.8 | 48.6 | 56.2 | 57.4 | 57.4 | 57.4 | 72.0 |
|  | Transmittance of infrared rays having a wavelength of 900 nm (%) | Infrared communication wave-transmitting region | 71.9 | 71.0 | 71.0 | 71.0 | 71.0 | 79.3 | 85.5 | 50.8 | 71.4 |
|  |  | Transparent region | 51.4 | 51.4 | 37.0 | 51.5 | 62.8 | 51.4 | 51.4 | 51.4 | 72.4 |
|  |  | Heat shielding property | ○ | ○ | ○ | ○ | ○ | ○ | ○ | ○ | X |
|  |  | Operability of sensor | ○ | ○ | ○ | ○ | ○ | ○ | ○ | X | ○ |

INDUSTRIAL APPLICABILITY

According to the present invention, it is possible to provide an interlayer film for a laminated glass, which has excellent heat shielding property and allows infrared communication waves to sufficiently pass therethrough. The present invention further provides a laminated glass which is obtained by using the interlayer film for a laminated glass.

BRIEF DESCRIPTION OF THE DRAWINGS

FIG. 1 is a schematic diagram illustrating an L-die mold in which a conduit tube having a slit for forming an infrared communication wave-transmitting region is inserted, which is used for producing the interlayer film for a laminated glass according to Example 1.

FIG. 2 is a schematic diagram illustrating an infrared communication wave-transmitting region and a transparent region of the interlayer film for a laminated glass obtained in Example 1.

FIG. 3 is a partial cross-sectional view of the interlayer film for a laminated glass obtained in Example 1, in which an infrared communication wave-transmitting region is formed.

The invention claimed is:

1. An interlayer film for a laminated glass,
   which comprises an infrared communication wave-transmitting region and a transparent region in a plane of the interlayer film,
   wherein the infrared communication wave-transmitting region has a composition comprising a binder resin and zinc oxide particles doped with a trivalent or tetravalent metal, and transmits infrared rays having a wavelength of 800 to 1000 nm and shields infrared rays having a wavelength of 1500 to 2100 nm,
   wherein the transparent region has a composition comprising a binder resin and metal hexaboride particles, and
   wherein the composition of the infrared communication wave-transmitting region is different than that of the transparent region.

2. The interlayer film for a laminated glass according to claim 1,
   wherein the transparent region further comprises zinc oxide particles doped with a trivalent or tetravalent metal.

3. A laminated glass,
   which comprises the interlayer film for a laminated glass according to claim 2, and a pair of transparent plates,
   the interlayer film being interposed between the transparent plates.

4. A laminated glass,
which comprises the interlayer film for a laminated glass according to claim 1, and a pair of transparent plates, the interlayer film being interposed between the transparent plates.

* * * * *